United States Patent [19]

Griffin

[11] Patent Number: 4,585,211
[45] Date of Patent: Apr. 29, 1986

[54] METHOD AND APPARATUS FOR ADJUSTING AGRICULTURAL CULTIVATOR TYNES

[75] Inventor: Alan Griffin, North Belair, Australia

[73] Assignee: Collison & Co., Adelaide, Australia

[21] Appl. No.: 690,681

[22] Filed: Jan. 11, 1985

Related U.S. Application Data

[62] Division of Ser. No. 397,683, Jul. 13, 1982, Pat. No. 4,502,548.

[30] Foreign Application Priority Data

Jul. 16, 1981 [AU] Australia ............................ PE9770

[51] Int. Cl.⁴ .............................................. B66F 3/36
[52] U.S. Cl. .................................... 254/10.5; 29/252; 29/227; 172/705
[58] Field of Search .................... 305/10, 31; 172/705; 254/10.5; 29/426.6, 446, 225, 227, 252

[56] References Cited

U.S. PATENT DOCUMENTS

| | | | |
|---|---|---|---|
| 2,760,772 | 8/1956 | McIntyre | 172/705 |
| 2,948,057 | 8/1960 | Dagenais | 254/10.5 |
| 3,008,772 | 11/1961 | Helsel | 305/10 |
| 3,098,529 | 7/1963 | Wade | 172/705 X |
| 3,216,772 | 11/1965 | Day | 305/10 |
| 3,586,306 | 6/1971 | Reece | 267/3 |
| 4,261,423 | 4/1981 | Williamson | 172/705 |
| 4,312,409 | 1/1982 | Mills | 172/572 |

FOREIGN PATENT DOCUMENTS 409123 12/1969 Australia .............................. 172/705

*Primary Examiner*—Richard J. Johnson
*Attorney, Agent, or Firm*—Pearne, Gordon, Sessions, McCoy, Granger, Tilberry

[57] ABSTRACT

An agricultural tyne assembly is disclosed which uses a series of linkages to transfer loading from the tyne as deflection of the tyne occurs upon striking an obstacle during tilling. There is also disclosed means to adjust the spring loading on an agricultural tyne.

3 Claims, 11 Drawing Figures

METHOD AND APPARATUS FOR ADJUSTING AGRICULTURAL CULTIVATOR TYNES

This is a division of application Ser. No. 397,683, filed July 13, 1982 now U.S. Pat. No. 4,502,548.

This invention relates to agricultural cultivators and more particularly to tyne assemblies for use on agricultural cultivators.

An agricultural cultivator normally consists of a substantially horizontal tool frame upon which are fastened a plurality of soil engaging tynes. It is desirable that each of these tynes be individually pivoted to the tool frame so that upon any one of the tynes striking an obstacle in use it may deflect backwards and upwards to pass over the obstacle and then return to its soil engaging position.

Many methods of obtaining such a stump jump function, as it is termed, have been proposed but in general these suffer from the problem that insufficient lift to pass over large obstacles is obtained and if sufficient lift is available then the return pressure to allow the tyne to become soil engaging again is insufficient to complete the return of the tyne. For instance there has been proposed a tyne deflection system in which a spring acts directly on the tyne so that a certain fixed load acts upon the tyne point so that as the tyne is drawn through the ground it will not be deflected in normal use. Then, as the tyne deflects on striking an obstacle the deflecting force increases as the spring compresses or expands depending on the positioning of the spring in relation to the tyne and hence as the tyne passes over the obstacle the returning force on the tyne greatly increases, and it may occur that the force is such that the obstacle is driven forward rather than the tyne passing over the obstacle. If the tyne does pass over the obstacle then during the early part of the return path a strong returning force or restoring force is obtained but as this tyne reaches its soil engaging position again the returning or restoring force decreases and in fact incomplete soil engagement may occur.

This problem exists with all types of ploughs and soil engaging implements but in particular for chisel ploughs a force preventing the deflection of the tyne when it is in the soil engaging position is required for some types of soil to be approximately 318 kilograms force at the share point (about 700 pounds) but it is desirable that this force be greatly reduced as the tyne deflects.

It will be realised that different soils will require different soil engaging forces and hence a problem to be overcome by this invention is to provide for adjustment of the static restoring force when the tyne is in the ground engaging position.

It will be realised, too, that if a high degree of lift is obtained from a deflectable tyne then a very long and cumbersome spring is required to enable this deflection. It will be desirable therefore to have a shorter more manageable spring.

It is an object of this invention therefore to provide an agricultural cultivator which has tynes adapted to deflect over large obstacles.

It is a further object to provide a spring tyne assembly adapted to deflect over large obstacles and in which the deflection force is inversely proportional to the degree of lift of the tyne from its normal operating position.

It is also a further object of this invention to provide an agricultural tyne having spring loading in which only a short travel of the spring enables large deflection of the tyne to enable the tyne to pass over obstacles.

It is a further object to provide for adjustment of the soil engaging force to allow for use of the agricultural implement for different soil or different ground types.

In one form therefore the invention is said to reside in a support arrangement for a tyne of a type adapted to allow for a swing back of the tyne when encountering an obstacle within the ground and to provide a restoring force to return the tyne to a tilling position after being swung back, the means supporting the tyne being characterised by providing for a restoring force that is less when the tyne is swung back than when it is in the tilling position.

The restoring force for the tyne may be provided by means of a helical spring or may be provided by a means of an hydraulic spring arrangement.

In a preferred form of the invention there may be further included adjustment means whereby to provide for variation of the static restoring force, that is, the restoring force when the tyne is in the tilling position for when the tyne is used in different soil or ground types.

This adjustment means may be provided by means of screw threaded adjustment means acting on a pressure rod positioned between the spring and the tyne.

In an alternative form, when the restoring force is provided by a helical spring the adjustment means may comprise a pressure rod upon which the spring acts and a collet and shoulder or abutment arrangement, a plurality of the shoulders being provided along the pressure rod, the collet being adapted to abut onto any one of the shoulders so as to provide a plurality of discreet spring tensions and hence static restoring forces.

This adjustment means may further include a traveller adapted to travel along the pressure rod, the spring abutting the traveller on one face thereof, the traveller having a shaped opposite face adapted to co-act with the collet and the collet having a complimentary shaped face to the opposite face such that when the traveller abuts the collet the collet may not be removed laterally. That is, the collet may not slide out or fall out but that the spring loading must be removed before the collet can be moved.

There may be further included adjustable means engageable between the traveller and the pressure rod or an abutment on the pressure rod such that the spring may be compressed so as to allow for removal of the collet and adjustment of the spring pressure.

There may be further included adjustable means engageable between the traveller and the pressure rod or an abutment on the pressure rod such that the spring may be compressed so as to allow for removal of the collet and adjustment of the spring pressure.

In an alternative form of the invention the invention may be said to reside in an agricultural tyne assembly of a type having a tyne adapted to deflect to clear obstacles, the tyne being pivotable about a mounting means affixed to a tool support frame, the tyne being loaded by spring pressure means and including a spring pressure rod to give resistance to oppose deflection of the tyne, characterised in that the tyne assembly includes a pair of link arm means, said link arm means being pivotally connected to one each of their respective ends to the spring pressure rod and the other ends of the link arm means being pivotally connected to the tyne and the mounting means respectively such that when the tyne is in a non-deflected position the spring pressure acts onto the tyne through the link arm means attached to the tyne but its spring pressure during deflection of the tyne is transferred from the link arm means attached to the tyne to the link arm means attached to the mounting means such that the spring pressure loading on the tyne is reduced during deflection of the tyne from a tilling position.

In the normal soil engaging or tilling position, force from the spring acts straight down the pressure rod onto the link attached between the pressure rod and the tyne and hence onto the tyne, but as deflection of the tyne occurs the line action of the force is varied as the spring is compressed so that progressively the spring deflection force is taken on the link connected between the spring pressure rod and the mounting means so that the actual force on the share point is reduced as the tyne is swung backwards.

By this means the actual deflection of the spring is small for the full deflection of the tyne.

The spring referred to in this embodiment may be a helical type spring or an hydraulic spring.

On this embodiment too there may be further included adjustment means on the spring pressure rod whereby to vary the spring loading on the tyne for different soil types.

In a further form the invention may be said to reside in a spring tension adjustment system for use with a spring loaded agricultural tyne wherein the spring is of a type acting along a spring pressure rod, and adjustment means is provided on the pressure rod whereby to vary the spring tension characterised in that the adjustment means comprises a plurality of shoulders on the pressure rod and a collet abutable against one of the shoulders whereby to provide a series of discreet spring tension adjustments.

In a preferred form of this form of the invention the spring tension adjustment system may include a traveller adapted to travel along the pressure rod and upon which the spring directly acts, the traveller having a face adapted to co-act with the collet such that when the traveller abuts the collet the collet may not be removed from the shoulder by an application of a direct lateral force.

In a preferred form of this part of the invention there may be further included spring tension adjustment means engageable between the traveller and the pressure rod such that the spring may be compressed for adjustment. The adjustment means may include an hydraulic jack to provide for compressing the spring for removal of the collet.

In a further form of the invention the invention may be said to reside in a method of adjusting spring tension acting on a spring pressure rod wherein the tension is variable in discreet steps by means of a collet engageable in one of a plurality of shoulders along the spring pressure rod, the method comprising the steps of providing spring compression means between the spring and an abutment on the spring pressure rod, compressing the spring so as to allow removal of the collet from one of the shoulders, expanding or compressing the spring further as required, placing the collet against the required shoulder and allowing the spring to expand against the collet and hence the required shoulder.

In a preferred form of this form of the invention the spring compression means may include an adjustment assembly including an hydraulic jack to provide the compressive force for the compression of the spring.

In a further form the invention may be said to reside in an agricultural implement having a tool frame and a plurality of tyne assemblies on the tool frame, the support arrangement of the tynes being characterised by any of the above preferred embodiments of the invention.

It will be seen therefore that by means of this invention there is provided a tyne asembly for an agricultural implement which has a deflectable tyne, the loading of which is reduced as the tyne is swung backwards. There is also provided adjustment means to adjust the static restoring force on the tyne.

To more clearly understand the invention however reference will be made to the accompanying illustrations in which several embodiments of the invention are disclosed.

Figure 1:
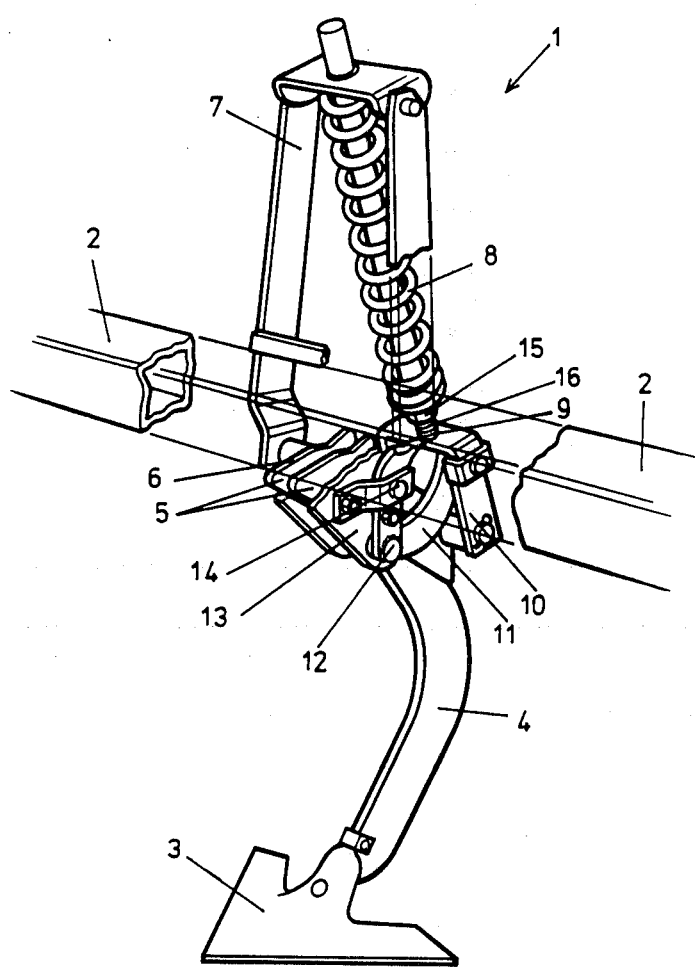
FIG. 1 shows a cutaway front view of one embodiment of the tyne.
Figure 3:
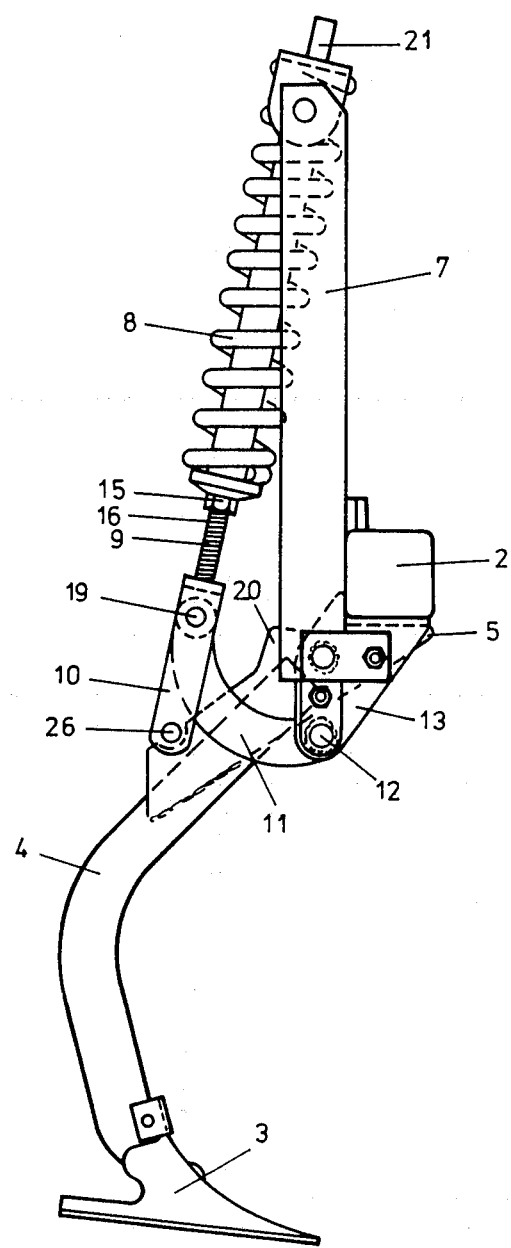
Figure 4:
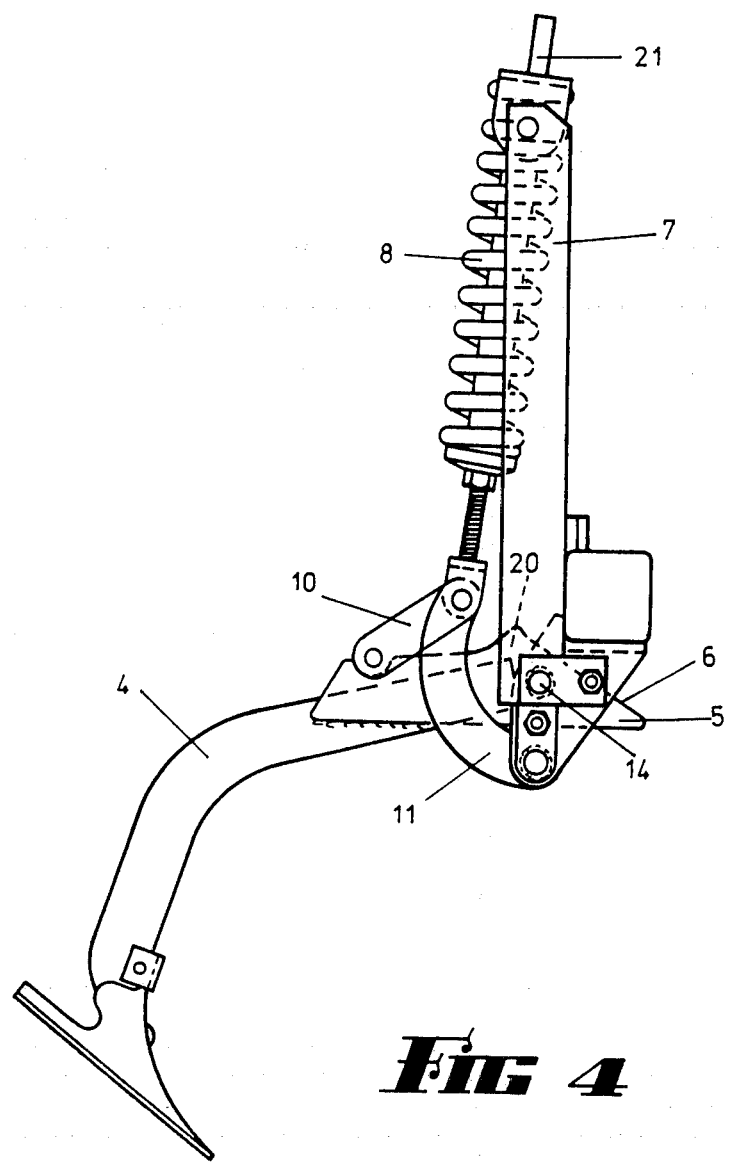
Figure 5:
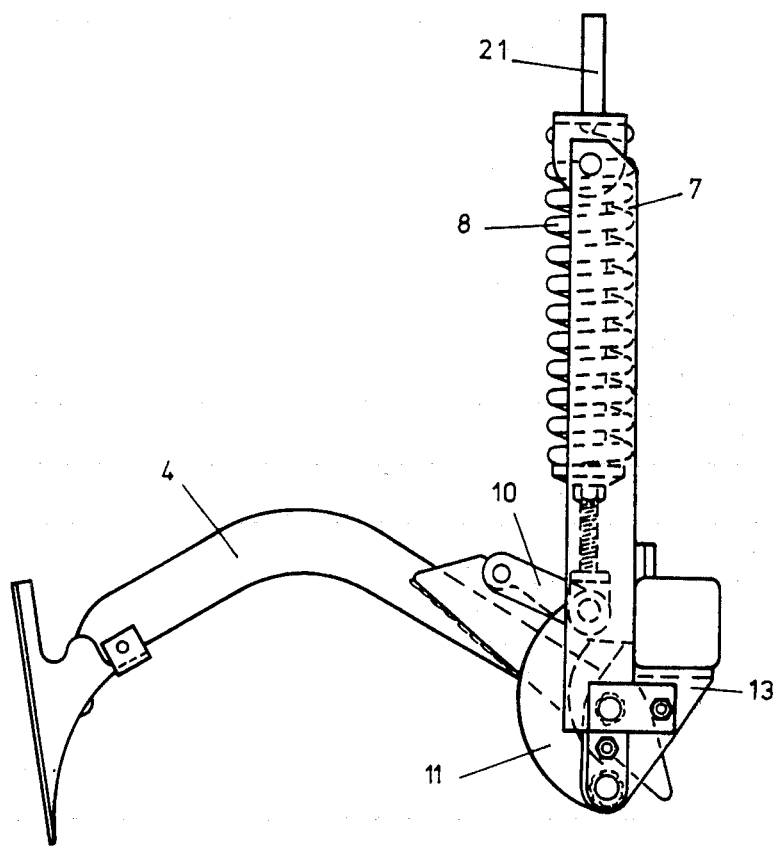

FIG. 3, FIG. 4, and FIG. 5 show a side view of the embodiment of the tyne shown in FIG. 1 at various stages of deflection.

Figure 2:
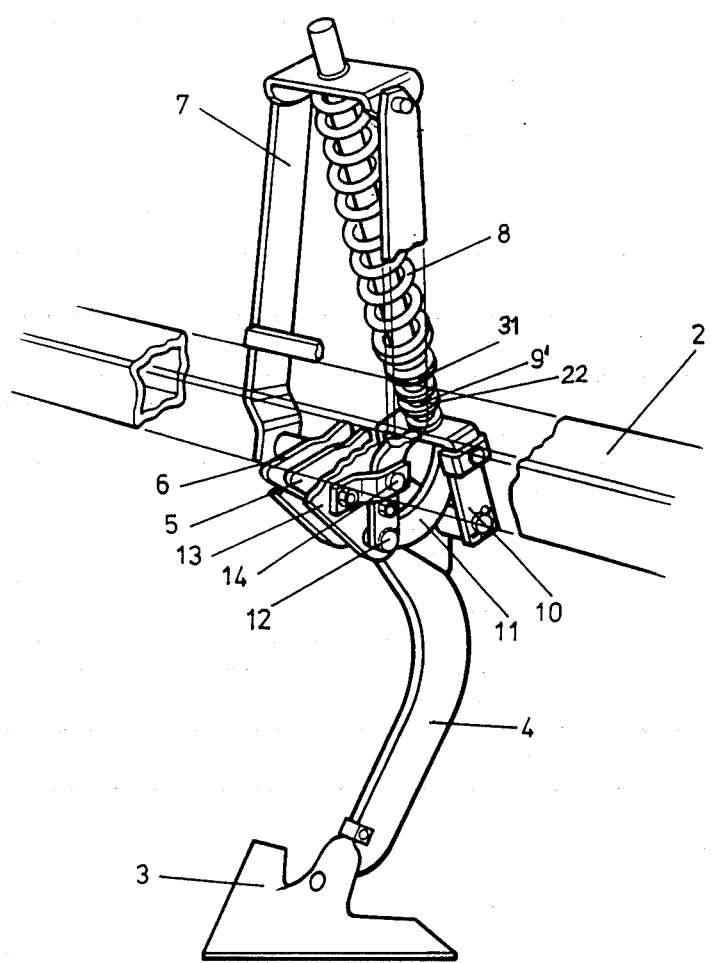
FIG. 2 shows a cutaway view of an alternative embodiment of the tyne.
Figure 6:
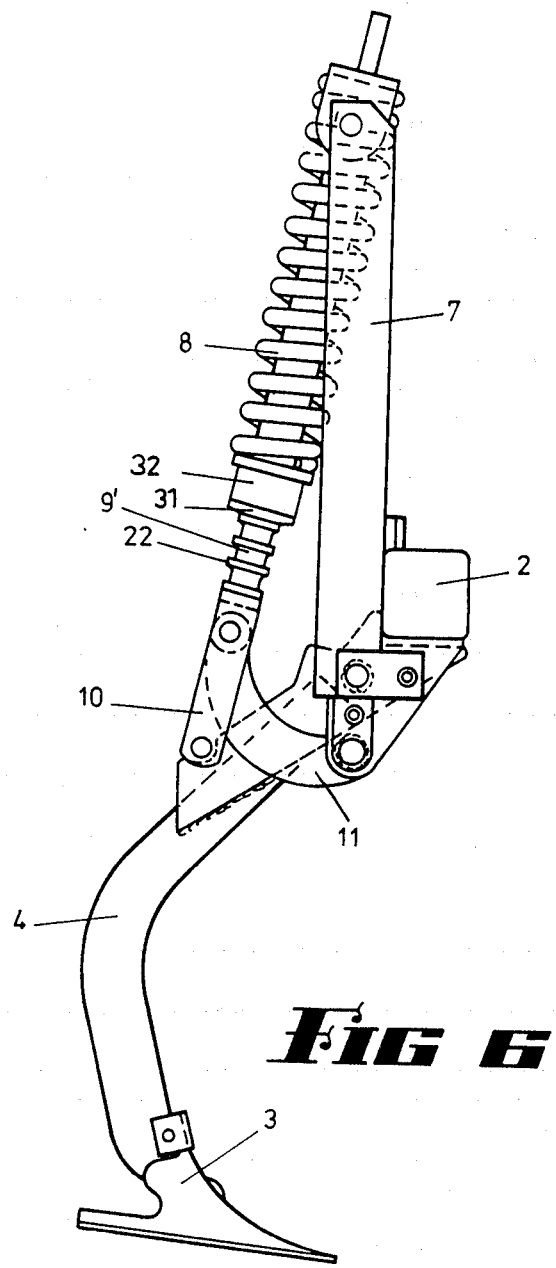

FIG. 6 shows a side view of the embodiment shown in FIG. 2 with the tyne in the tilling position.

Figure 7:
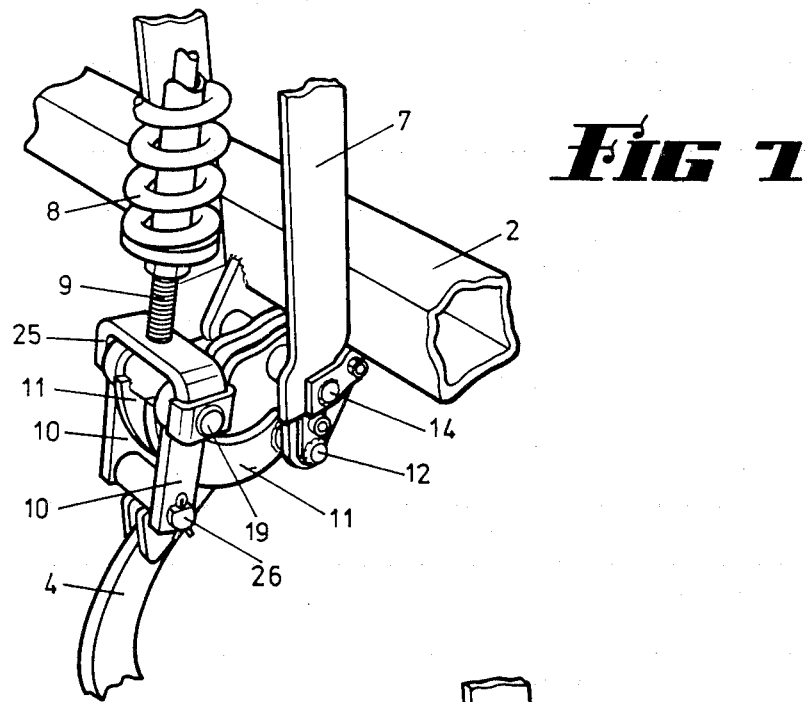

FIG. 7 shows a rear quarter view of the embodiment of the tyne shown in FIG. 1 particularly showing the spring tension adjustment means.

Figure 8:
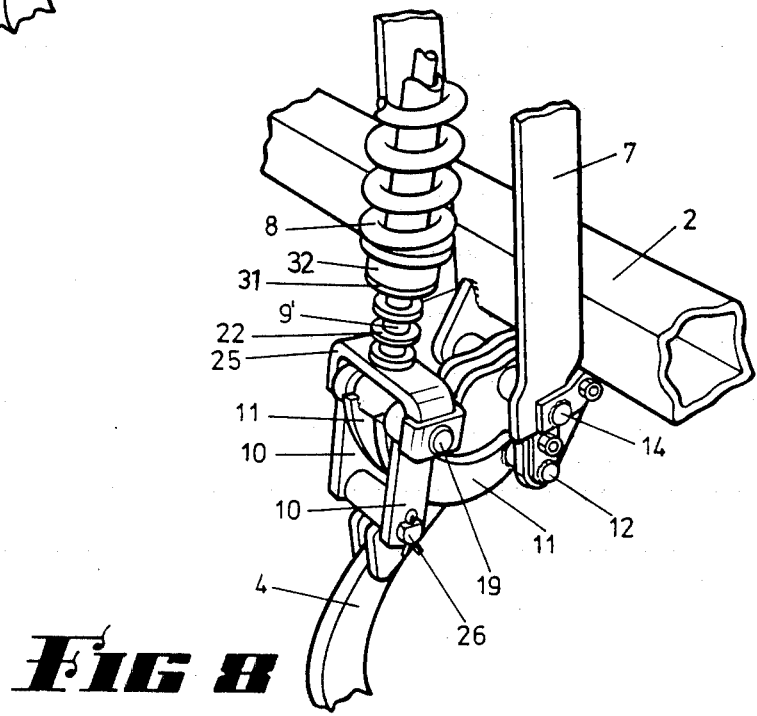

FIG. 8 shows a rear quarter view of the embodiment of the tyne shown in FIG. 2 particularly showing an alternative tension adjustment means.

Figure 9:
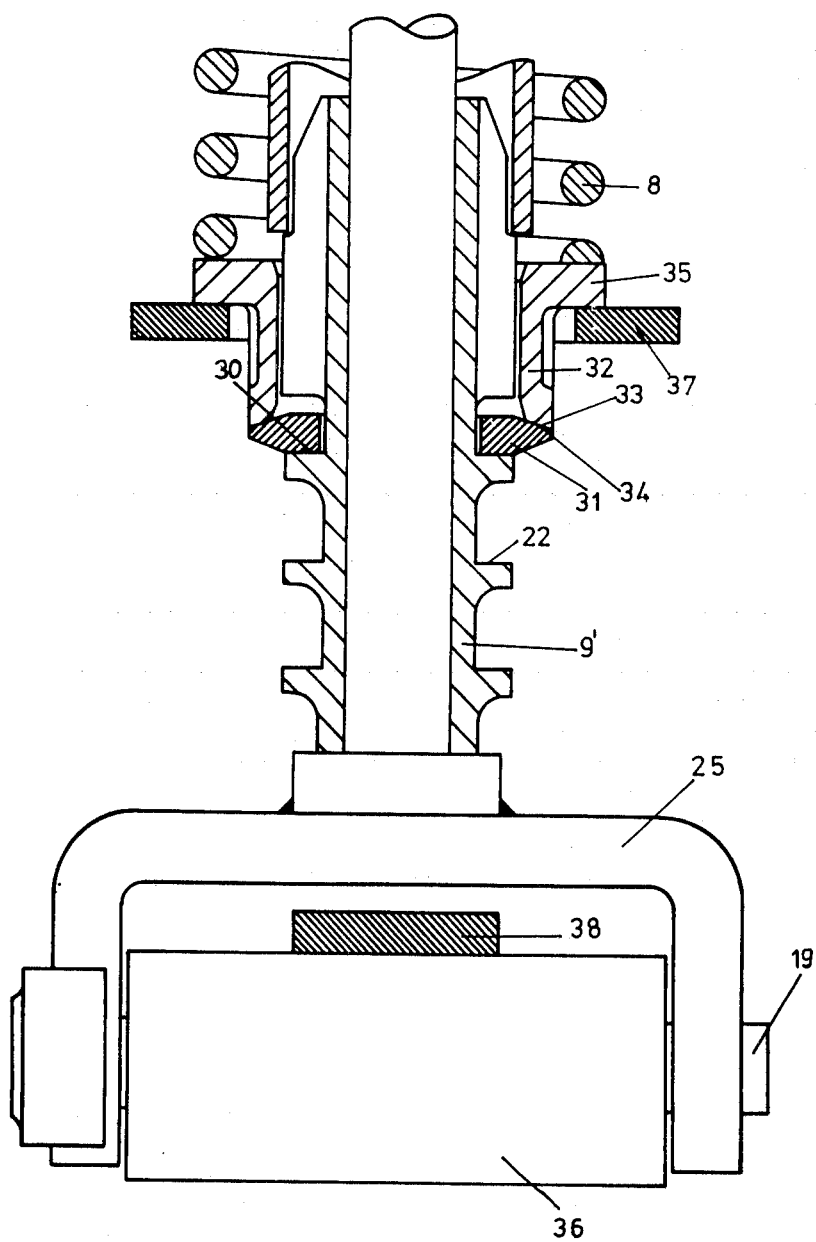

FIG. 9 shows a view of the spring tension adjustment system using a collet and abutment shoulders.

Figure 10:
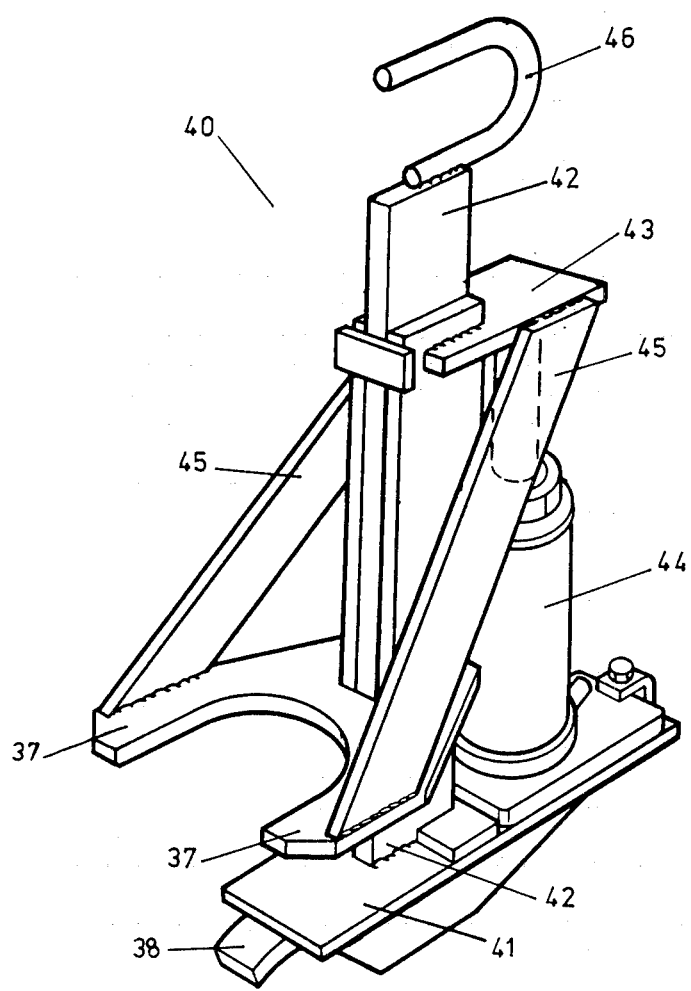

FIG. 10 shows a spring tension adjustment device according to the invention and

Figure 11:
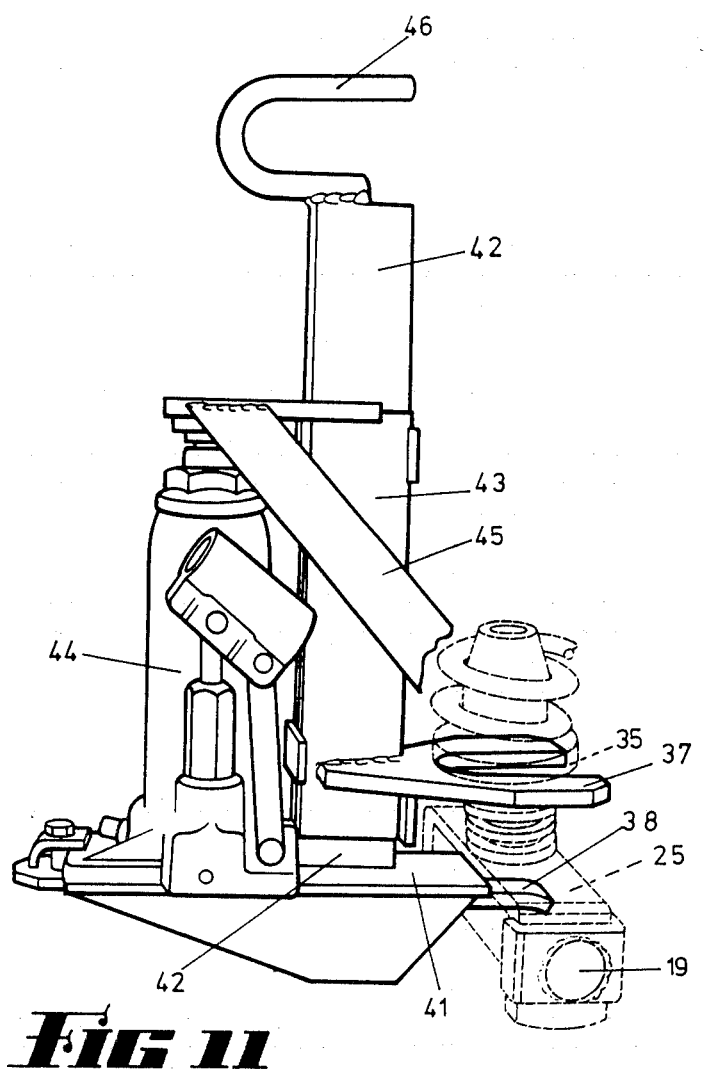

FIG. 11 shows an alternative view of the spring tension adjustment device according to the invention.

Now looking in more detail at FIG. 1, the tyne assembly is mounted on a tool frame bar 2, shown cutaway. The tyne assembly consists of a blade 3, a tyne arm 4, the arm 4 being pivoted about pivot point 14, at the upper end of the arm 4 are welded plates 5 having a flat upper surface 6 which abut underneath the tool frame 2 when the arm is in the tilling position.

A spring support assembly 7 supports a spring 8 which bears onto the tyne arm through the spring pressure rod 9 and the spring pressure rod to tyne link 10. A further link 11 extends from the spring pressure rod to a pivot point 12 on the mounting plate 13.

The spring tension adjustment means in FIG. 1 is by means of a nut 15 travelling on a screw thread 16.

FIG. 2 shows an alternative embodiment having different adjustment means and in this means a series of shoulders or abutments 22 are formed on the lower end of the pressure rod 9' and a collet 31 abuts one of these shoulders and is abutted against by the spring 8.

Now looking at FIGS. 3, 4, and 5 to show the progressive deflection of the tyne, it will be seen that in FIG. 3, the tyne is in its tilling position with the plate 5 abutting up against the tool frame 2. At this stage the spring 8 acts directly down the spring pressure rod 9 and its saddle 25 and pivot 19 onto the link 10 and directly onto the arm 4. At this stage the link 11 will be taking little or no load.

As shown in FIG. 4 as the arm 4 is deflected it pivots about the pivot point 14 and the line of action of the force exerted by the spring 8 is now divided between the link 10 and the link 11.

As shown in FIG. 5 when the arm 4 has reached its uppermost position the spring 8 has its force acting almost directly down through the link 11 onto the mounting plate 13. The link 10 would in fact be taking very little load onto the tyne arm 4.

The uppermost limit of the travel of the tyne arm 4 occurs when the plate 5 abuts by means of the abutment 20 onto the back of the tool frame 2.

It will be seen that by reference to FIGS. 3, 4, and 5 that while the tyne has deflected through almost 90° the actual compression of the spring as can be seen by the upper extension 21 of the spring pressure rod 9 extending above the spring support assembly 7. This means that a relatively short and non-cumbersome spring can be used to provide all the necessary returning or restoring force for the tyne.

FIG. 6 shows an alternative embodiment of the adjustment means in which the pressure rod 9' has a plurality of shoulders or abutments 22 against one of which a collet 31 abuts.

A traveller 32 has the spring 8 abutting on one side of it and abuts the collet 31.

FIGS. 7 and 8 show rear views of the tyne assembly and in these figures numbers refer to the numbers from the earlier discussion.

An important point to note is that the lower end of the pressure rod 9 has the saddle 25 through which the pin 19 passes, the links 10 and the links 11 are both pivoted to this pivot 19 but are not rigidly rotationally fixed one to the other. A further pivot point 26 is also provided at the lower end of the link between the pressure rod and the tyne arm 4.

Now looking at FIG. 9 it will be seen that the pressure rod 9' includes a series of abutments 22 and on the uppermost abutment there is a collet 31 being forced against a shoulder or abutment 30 by means of the traveller 32 which in turn is forced down by means of the spring 8.

It will be seen that the traveller 32 has a shaped lower end 33 and the collet 31 has a correspondingly shaped face 34 such that once the collet is in position it cannot be removed directly sideways but in fact the traveller must be lifted slightly before the collet may be removed.

In fact the collet 31 is of an approximately horse shoe shape so that it may be slid on and off the respective shoulders.

Compression of the spring 8 is achieved by means of providing a expansion force between the abutment 35 on the traveller 32 and the sleeve 36 on the pivot pin 19. This force is provided by means of the arms 37 and 38 acting onto the abutment 35 and the sleeve 36 respectively.

FIG. 10 shows the type of device which may be used to provide the expansion force for the spring.

The adjustment device generally shown as 40 comprises a base 41 and an upright 42 rigidly affixed to the base. The arm 38 is firmly attached to the base 41.

A sliding arrangement 43 may slide up and down the upright 42 and this slider 43 carries the arms 37 which engage under the shoulder 35 on the traveller 32.

An hydraulic jack 44 of any known type may be used to provide the expansive force between the base 41 and the slider 43. Transmission of the force from the hydraulic jack is assisted by means of the braces 45 extending down to the arms 37. A handle 46 is provided on the top of the upright 42 to assist in carrying and positioning the adjustment device 40.

Adjustment of the spring tension using the screw thread arrangement is such that for a complete agricultural implement to adjust all the spring tensions on all of the tynes on an agricultural implement it may take a complete days work whereas by use of this proposed adjustment device the time to complete this operation may be greatly reduced.

In one particular embodiment of the deflecting tyne and cultivating tyne according to this invention the spring on the tyne provide a restoring force to resist cultivating forces at the share point in excess of 318 kilograms force but the system of linkages is such that the tyne share point is allowed to deflect to lift over obstacles of a height of approximately 500 millimeters or 20 inches. Over the first portion of tyne deflection of 15 degrees or 23 millimeters clearance under the share point the resistance to deflections increases from 318 kilograms and decreases back to approximately 318 kilograms force but that as deflection increases up to 35 degress or 123 millimeters under the share point the resistance to deflection reduces to 257 kilograms force (565 pounds). This should ensure sufficient penetration effort to return the tyne share to its normal operation position.

From the 15 degree deflection position the share resistance force decreases in a straight line in proportion to the angular deflection of the tyne to a maximum return load of 57 kilogram force (125 pounds) when the tyne has deflected 73 degrees or 500 millimeters clearance under the share point. This reduction in the resistance force at the share is a result of the redistribution of the increasing spring load which would normally be applied to the tyne to the secondary arcuate linkage which absorbs this increase internally.

In this embodiment the actual spring compressive movement to achieve the desired maximum share lift of 500 millimeters has been reduced from 248 millimeters (9¾ inches) which is impractical to achieve to 88 millimeters (3½ inches).

It should be noted that by the use of the present invention advantages over conventional spring actuating systems are obtained and in particular for chisel plough tynes high share lift clearance is obtained, there is reduced wear on pressure rod guide components, there is an economy of spring design and a reduction in tyne deflection forces at the share point to reduce return impact loads.

Taking this last point the reduction in the tyne deflection forces at the share point which reduce return impact loads mean that design of the tyne arms may be advantageously altered. Conventional chisel plough tyne arms are normally 51 millimeters (2 inches wide) and in the soil engaging area the wrap around of the share increases this width to approximately 65 milimeters (2½ inches). As the width of the tyne in the area of the share has a major influence on the draught requirements of the tractor to tow the agricultural implement any reduction in width in this area will reduce the draught force necessary and consequently reduce fuel consumption of the operation. In the present invention the tyne may be made from a material section of 65 millimeters by 20 millimeters with a width at the wrap around the share area of a maximum 36 millimeters. This reduces the face width in this area by 45 percent with a corresponding reduction in draught force necessary.

The claims defining the invention are as follows; I claim:

1. A method of adjusting spring tension acting on a spring pressure rod in an agricultural tyne wherein the tension is variable in discreet steps by means of a collet abuttingly engageable against any one of a plurality of shoulders along the spring pressure rod, the method comprising the steps of providing a hydraulic jack spring compression means between the spring and an abutment on the spring pressure rod, compressing the spring with the hydraulic jack so as to allow for removal of the collet from one of the shoulders, expanding or compressing the spring further as required, placing the collet against the required shoulder and allowing the spring to expand against the collet and hence the required shoulder.

2. A spring tension adjustment system for use with a spring loaded agricultural tyne wherein the spring is of a type acting along the spring pressure rod, an adjustment means is provided on the pressure rod whereby to vary the spring tension, characterized in that the adjustment means comprises a plurality of shoulders on the pressure rod, a collet abuttable against any one of the shoulders to provide a series of discreet spring tension adjustments, and means independent of the collet engageable between the spring and the pressure rod such that the spring may be compressed for adjustment, said independent means including a hydraulic jack adapted to provide the spring compressive force.

3. A spring tension adjustment system as in claim 2 wherein the spring includes a traveller adapted to travel along the pressure rod and upon which the spring directly acts, the traveller having a face adapted to co-act with the collet such that when the traveller abuts the collet the collet may not be removed from the shoulder by the application of a direct lateral force.

* * * * *